F. B. PERRY.
FRUIT STONING MACHINE.
APPLICATION FILED FEB. 24, 1912.
1,119,038.
Patented Dec. 1, 1914.
4 SHEETS—SHEET 3.
Fig-5-
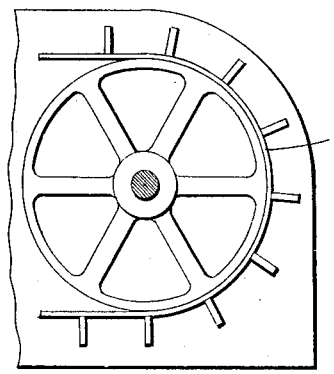
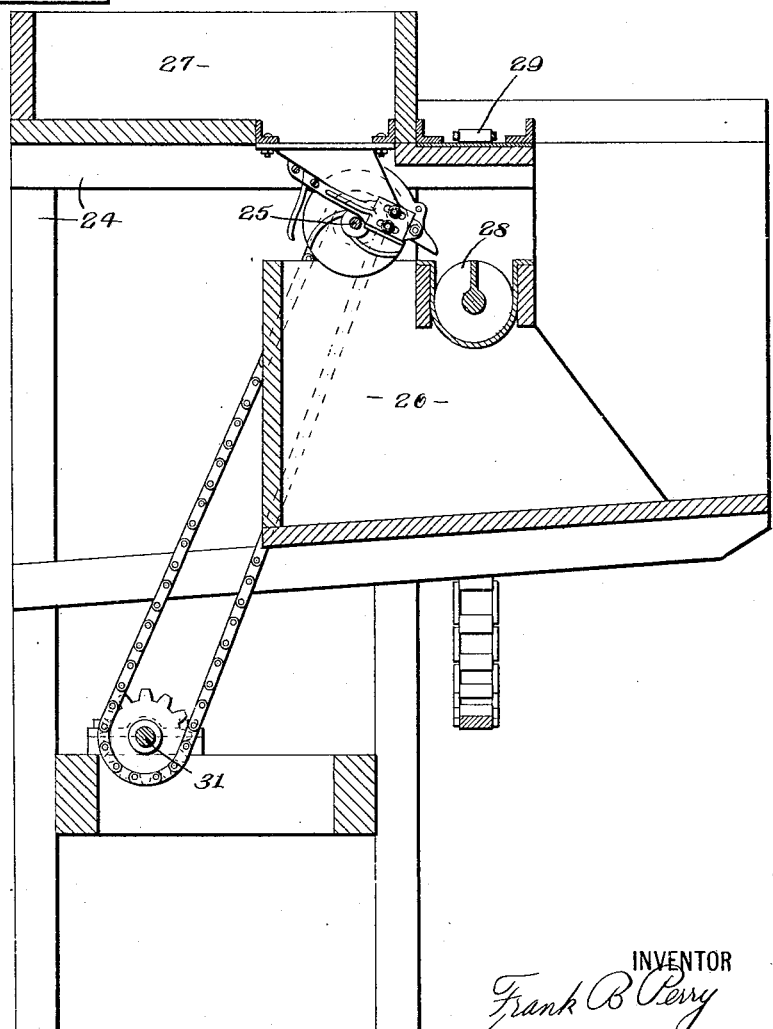

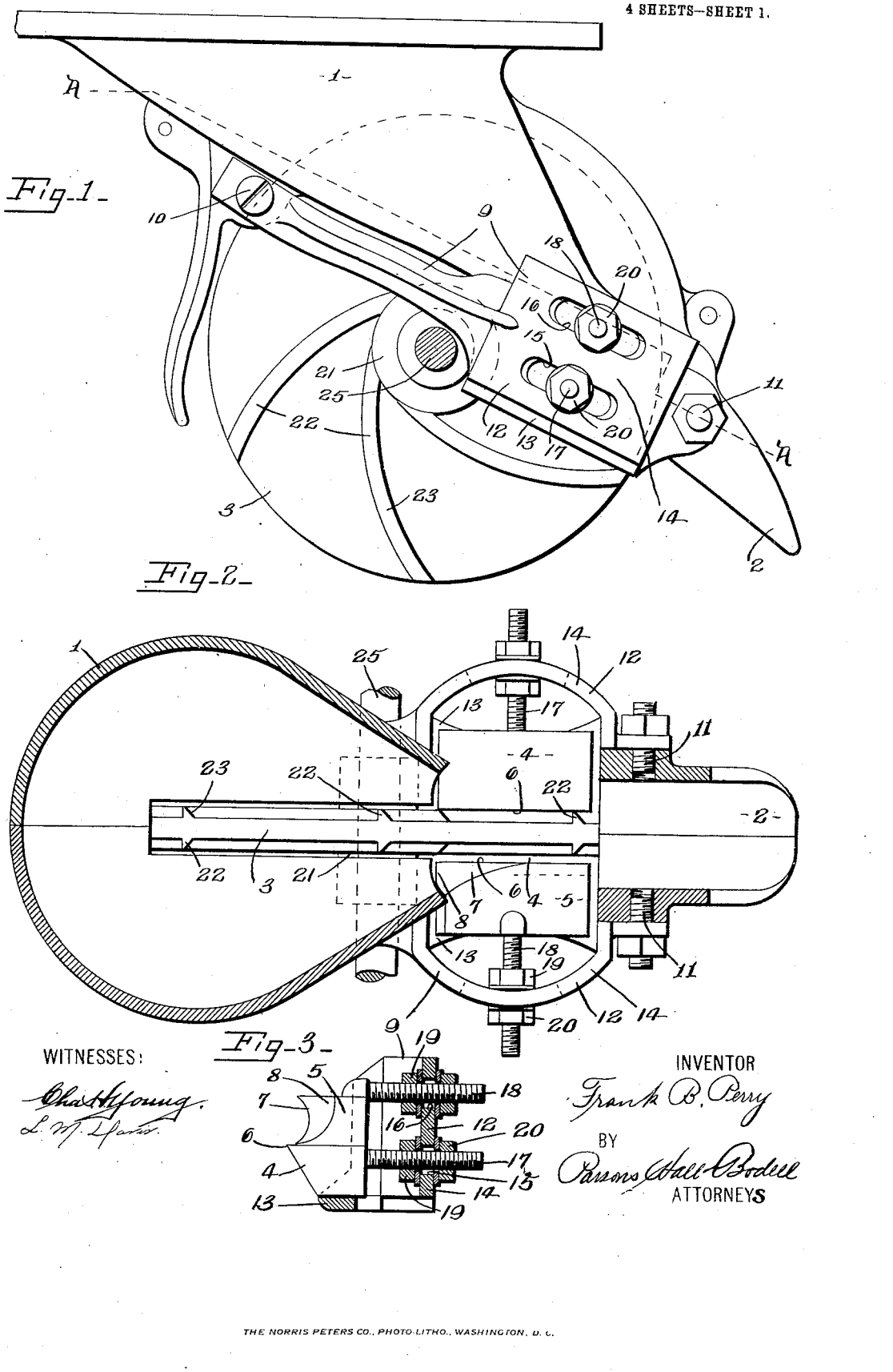

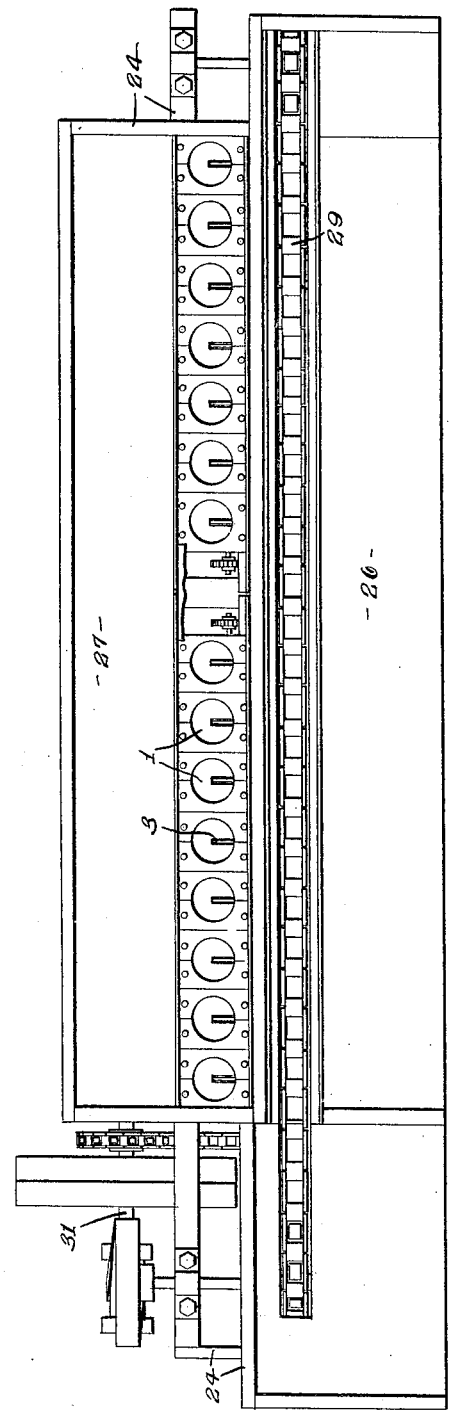

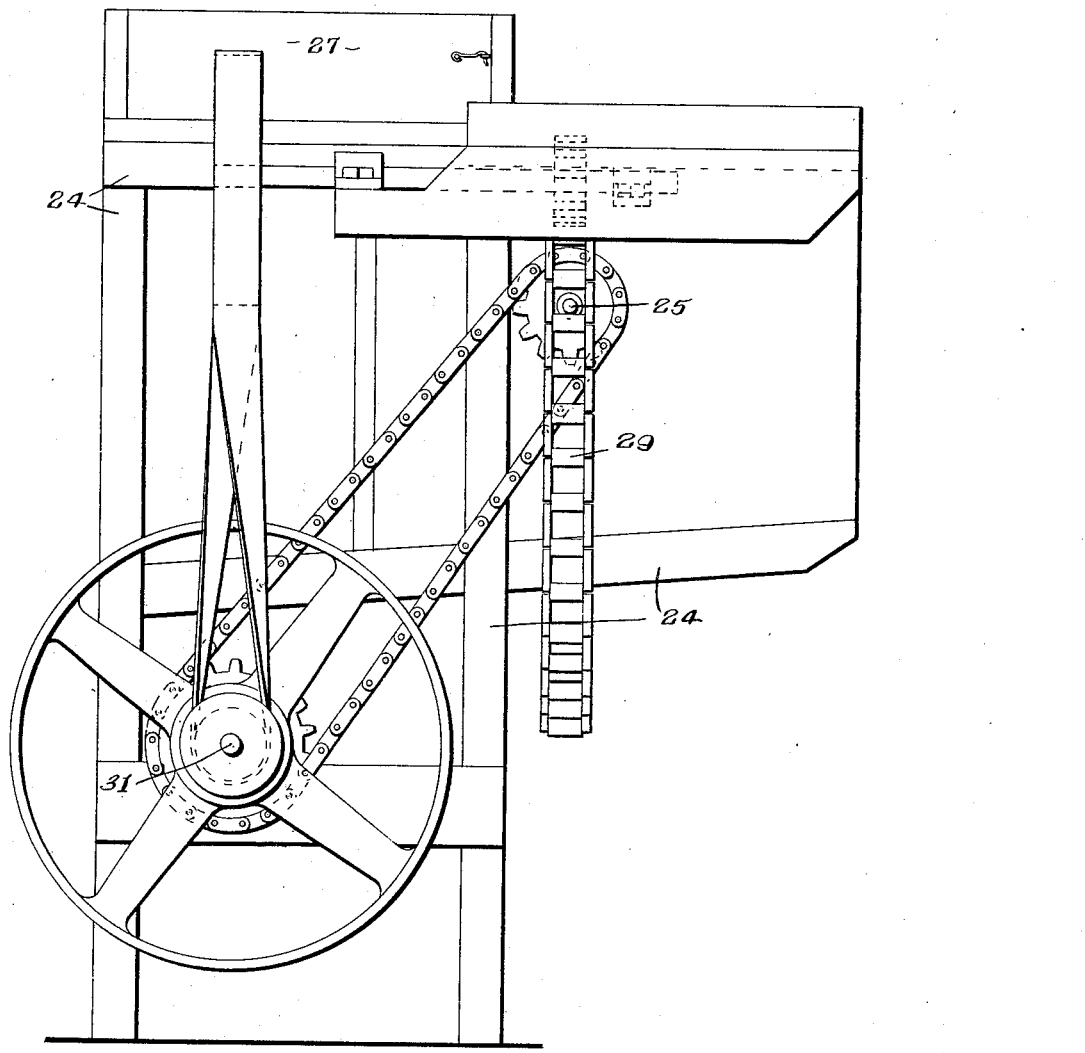

UNITED STATES PATENT OFFICE.

FRANK B. PERRY, OF MANLIUS, NEW YORK.

FRUIT-STONING MACHINE.

1,119,038.   Specification of Letters Patent.   Patented Dec. 1, 1914.

Application filed February 24, 1912. Serial No. 679,616.

*To all whom it may concern:*

Be it known that I, FRANK B. PERRY, of Manlius, in the county of Onondaga and State of New York, have invented a certain new and useful Fruit-Stoning Machine, of which the following is a specification.

This invention has for its object a particularly simple and efficient fruit stoning machine; and it consists in the combinations and constructions hereinafter set forth and claimed.

In describing this invention reference is had to the accompanying drawing in which like characters designate corresponding parts in all the views.

Figure 1 is a side elevation of my fruit stoning machine. Fig. 2 is a sectional view on line "A—A" Fig. 1, one of the throat members on one side of the disk being removed to disclose the underlying throat member. Fig. 3 is a detail view of the throat of said machine and contiguous parts. Fig. 4 is a plan view of the apparatus embodying a gang of my machines. Fig. 5 is a vertical sectional view through the apparatus shown in Fig. 4. Fig. 6 is an end elevation of such apparatus.

Each fruit stoning machine, as here illustrated, comprises the usual hopper 1 having an outlet 2 for the stones and a throat in front of such outlet, and means as a cam disk 3 for feeding the fruit to the throat and forcing the stones from the fruit and through the throat to the outlet 2.

The hopper may be of any desirable form, size and construction and the throat for each of the fruit stoning machines comprises elements arranged on opposite sides of the disk 3 and adjustable rectilinearly toward and from the side faces of the disk 3 and also curvilinearly relatively to such faces, and said elements are carried by supports fixed to the hopper 1.

In the illustrated embodiment of my invention each of the elements forming the throat, comprises a base member 4 and a superposed member 5 mounted on the base, the base member being adjustable rectilinearly toward and from the opposing side face of the cam disk 3 and also curvilinearly relatively to the cam disk 3. The face of the base member 4 opposed to the cam disk 3 is beveled and terminates in an edge 6 which owing to the rectilinear and curvilinear adjustments of the base member 4, can be brought in close juxtaposition to the cam disk 3. The member 5 mounted on the base member 4, is also adjustable rectilinearly and curvilinearly independently to the member 4, relatively to the opposing face of the cam disk 3, and its face opposed to the cam disk is grooved at 7 in order to conform to the shape of the stones and such groove widens outwardly and upwardly through the upper face of the member 5 as indicated at 8, Fig. 2, in order to receive the fruit prior to the removal of the stones therefrom.

Owing to the adjustment of the throat members 4, 5 such members can be arranged to work most efficiently on different species of fruit. For instance this machine is particularly adapted to remove the stones from cherries and when removing the stones from small cherries as sour cherries, the machine can be adjusted to operate on such cherries and when used to remove the stones from a larger species of cherries as oxheart, the machine can be adjusted to operate most efficiently on such larger species.

Different curvilinear adjustments are desirable in operating on grades of cherries of different size but having the same size stone, as owing to the curvilinear and rectilinear adjustments, the throat can be adjusted so that the machine will remove the stone with a minimum tearing or mutilating of the flesh, cherries of larger size requiring more of a taper than cherries of a smaller grade, with practically the same size pit or stone. This curvilinear adjustment permits the throat to be shaped differently but be the same size at its exit end.

The adjustment of the lower block 4 prevents the pit from being carried along with the flesh of the cherry and is adjustable in the manner described in order to prevent undue mutilation of the cherry. In operating on cherries, the pit is carried through the throat and discharged through the chute 2 while the flesh of the cherries is carried along by the flanges on the disk 3 and discharged from the lower side of the disk.

I have found in practice that the positive adjustment of the throat members, as set forth, is much more efficient than the yielding throat members heretofore employed. The throat members are carried on opposite sides of the hopper by suitable adjustable supports, as the support 9, fixed respectively at 10 and 11 to the hopper and including a bridge like portion 12 intermediate of its ends which supports the throat members 4, 5. This bridge like portion is provided with a bottom 13 upon which the base member 4 rests and with a side wall 14 having a cylindrically curved face and slots 15 and 16 extending therethrough, and the members 4, 5 are provided respectively with threaded stems 17 and 18 extending through the slots 15 and 16 respectively and upon which are turned nuts 19, 20 arranged on opposite sides of the side wall 14. Obviously by adjusting the nuts 19, 20 the stems 17 or 18 can be moved rectilinearly to carry the members 4, 5 inwardly or outwardly and also such elements can be moved in the slots and thereby adjust such members 4, 5 curvilinearly.

The cam disk 3 is provided with a hub 21 mounted on a suitable supporting shaft and with ribs 22 extending tangentially relatively to the hub and located on opposite sides of the cam disk, each of the ribs having its advance face 23 beveled and arranged at an oblique angle to the side face of the disk 3. Such beveling of the ribs 22 forces the stones from the fruit with minimum mutilation of the fruit compared with the operation of the ribs having more abrupt faces.

The adjustment of the throat members as set forth, is particularly advantageous in machines in which a gang of fruit stoning machines having their cam disks arranged on a common shaft, as any slight displacement of the disks out of alinement can be compensated for by the rectilinear and curvilinear adjustments of the throat members.

In Figs. 4, 5 and 6 is illustrated an apparatus embodying gangs of cherry stoning machines provided with my invention, such apparatus comprising a frame 24, a horizontal shaft or shafts 25 journaled in the frame 24 upon which the cam disks 3 of the gang are mounted, a receiver 26 located below the exits for the fruit of the machines, and being common to all of the machines in the gang, a hopper or bin 27 on the upper part of the machine for receiving the whole fruit to be fed into the hoppers 1, all of the hoppers of the gang opening through the bottom of such bin 27, a conveyer 28 arranged to receive the stones from the outlet 2 of all the machines of the gang, and means for actuating the shaft 25 and conveyer 28 and any other moving parts of the apparatus. The apparatus is also usually provided with a suitable conveyer 29 for carrying away the cans which have been filled by hand from the receiver 26. The apparatus may also be provided, if desired, with a suitable carrier 30 for conveying the fruit in bulk to the bin 27.

The actuating means comprises a driving shaft 31, and power-transmitting means between such driving shaft and the shaft 25, conveyers 28 and 29 and other moving parts. As such power-transmitting mechanism may be of any form, size and construction, it is thought that further description is unnecessary.

What I claim is:

1. In a fruit-stoning machine, a hopper for receiving the fruit having a throat in which the stones are removed and means for feeding the fruit and forcing the stones therefrom and through the throat, the throat comprising a member adjustable rectilinearly relatively to the feeding means and also curvilinearly, substantially as and for the purpose described.

2. In a fruit stoning machine, a hopper for receiving the fruit having a throat in which stones are removed, and means for feeding the fruit and forcing the stones through the throat, the throat comprising members arranged on opposite sides of a portion of the feeding means and adjustable rectilinearly and also curvilinearly relatively to said feeding means, substantially as and for the purpose specified.

3. In a fruit stoning machine, a hopper for receiving the fruit having a throat in which stones are removed, means for feeding the fruit and forcing the stones therefrom and through the throat, the throat comprising an element including a base member and a superposed member mounted on the base member, the base member being adjustable relatively to the opposed portion of the feeding means, and the upper member being adjustable rectilinearly and also curvilinearly, substantially as and for the purpose set forth.

4. In a fruit stoning machine, a hopper for receiving the fruit having a throat in which the stones are removed, means for feeding the fruit and forcing the stones therefrom and through the throat, the throat comprising elements arranged on opposite sides of a portion of the feeding means, each element comprising a base member, and a superposed member mounted on the base member, the base member being adjustable relatively to the opposed portion of the feeding means, and the upper member being adjustable rectilinearly and curvilinearly, substantially as and for the purpose described.

5. In a fruit stoning machine, a hopper for receiving the fruit having a throat in which the stones are removed, means for feeding the fruit and forcing the stones therefrom and through the throat, said throat being formed by means comprising an element composed of a base member and a superposed member mounted on the base member, the base member being opposed to a portion of the feeding means, and being adjustable rectilinearly toward and from the plane of said feeding means and also curvilinearly, and the upper member being also adjustable rectilinearly and curvilinearly independently of the base member, relatively to the opposing portion of the feeding means for regulating the size and form of the throat, substantially as and for the purpose specified.

6. In a fruit stoning machine, a hopper for receiving the fruit having a throat in which the stones are removed, means for feeding the fruit and forcing the stones therefrom and through the throat, and the throat comprising elements arranged on opposite sides of a portion of the feeding means, each element being composed of a base member, a superposed member mounted on the base member, and each base member being adjustable toward and from the opposing portion of the feeding means, and also curvilinearly relatively thereto and each superposed member being also adjustable independently of the base member rectilinearly and curvilinearly, substantially as and for the purpose set forth.

7. In a fruit stoning machine, a hopper for receiving the fruit having a throat in which the stones are removed, means for feeding the fruit and forcing the stones therefrom and through the throat, and the throat comprising a member adjustable rectilinearly and curvilinearly, a support for said member, the support being fixed relatively to the hopper, and having an arc shaped bearing surface, and a slot opening through such surface, and said throat member being formed with a threaded stem extending through the slot, and a nut turning on the portion thereof projecting through the slot against such cylindrical face, whereby the throat member can be adjusted about the axis of the center of the arc of said slot, substantially as and for the purpose described.

8. An apparatus for stoning fruit comprising a frame, a shaft journaled in the frame, a gang of fruit stoning machines supported side by side by the frame, each including a hopper having outlets respectively for the fruit and the stones, and a cam disk for feeding the fruit and forcing the stones through the throat, a shaft common to all of the machines and upon which all of said disks are mounted, a receiver common to all of the machines and located below the outlets for the stoned fruit, a conveyer for receiving the stones discharged from the outlets for the stones, the conveyer being common to all of such machines, a receiver for the fruit to be stoned above the hoppers and communicating with all of the hoppers, and means for actuating such shaft and the conveyer, substantially as and for the purpose set forth.

In testimony whereof, I have hereunto signed my name in the presence of two attesting witnesses, at Palatka, in the county of Putnam, in the State of Florida, this 22nd day of January, 1912.

FRANK B. PERRY.

Witnesses:
  E. E. HASKELL,
  JAMES A. MOSIER.

Copies of this patent may be obtained for five cents each, by addressing the "Commissioner of Patents, Washington, D. C."